United States Patent
Tsai (10) Patent No.: US 11,770,080 B1
(45) Date of Patent: Sep. 26, 2023

(54) METHOD FOR INCREASING RESOLUTION BY N BITS PERFORMED BY PROCESSING CIRCUIT OF MOTOR DRIVING SYSTEM AND ASSOCIATED MOTOR DRIVING SYSTEM

(71) Applicant: Elite Semiconductor Microelectronics Technology Inc., Hsinchu (TW)

(72) Inventor: Ming-Fu Tsai, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 0 days.

(21) Appl. No.: 17/844,692

(22) Filed: Jun. 20, 2022

(51) Int. Cl.
*H02P 6/08* (2016.01)
*H02P 6/06* (2006.01)
*H02P 27/08* (2006.01)
*H02K 11/33* (2016.01)

(52) U.S. Cl.
CPC .............. *H02P 6/08* (2013.01); *H02K 11/33* (2016.01); *H02P 6/06* (2013.01); *H02P 27/08* (2013.01)

(58) Field of Classification Search
CPC ... H02P 27/08; H02P 6/08; H02P 6/06; H02K 11/33
See application file for complete search history.

(56) References Cited

U.S. PATENT DOCUMENTS

| | | | |
|---|---|---|---|
| 7,449,854 B2 * | 11/2008 | Tsubota | H02P 27/08 318/400.06 |
| 2015/0028789 A1 * | 1/2015 | Uchida | H02P 25/028 318/619 |
| 2018/0351484 A1 * | 12/2018 | Mizuo | H02P 6/24 |

FOREIGN PATENT DOCUMENTS

| | | |
|---|---|---|
| EP | 0 802 622 A2 | 10/1997 |
| TW | 201206083 A1 | 2/2012 |
| TW | 201517497 A | 5/2015 |

* cited by examiner

*Primary Examiner* — Thai T Dinh
(74) *Attorney, Agent, or Firm* — Winston Hsu (57) ABSTRACT

A method for increasing a resolution by N bits performed by a processing circuit of a motor driving system, where N is a positive integer, and the method includes: performing a conversion upon an analog command, to generate a command count value; performing a first N-bit right-shifting operation upon the command count value, to generate an initial output value; performing a logical operation upon the command count value, to generate a low bit value; generating an overflow value according to the low bit value; and determining a final output value according to the initial output value and the overflow value.

14 Claims, 4 Drawing Sheets

METHOD FOR INCREASING RESOLUTION BY N BITS PERFORMED BY PROCESSING CIRCUIT OF MOTOR DRIVING SYSTEM AND ASSOCIATED MOTOR DRIVING SYSTEM

BACKGROUND OF THE INVENTION

1. Field of the Invention

The present invention is related to a brushless direct current (DC) motor, and more particularly, to a method for increasing a resolution by N bits performed by a processing circuit of a motor driving system and associated motor driving system, wherein the resolution may be a pulse width modulation (PWM) resolution or a rotational speed resolution, and N is a positive integer.

2. Description of the Prior Art

For a brushless DC motor, a processing circuit (e.g. a micro control unit, MCU) of the brushless DC motor may output a plurality of PWM signals to a driving circuit that is coupled to the brushless DC motor, to generate a driving voltage for driving the brushless DC motor, wherein the driving voltage is proportional to the rotational speed of the brushless DC motor. When the PWM signals are utilized to drive the brushless DC motor, if the resolution of the PWM signals is insufficient, the voltage resolution will also be insufficient, which will cause the brushless DC motor to run unsmoothly, and the brushless DC motor will be unstable.

In a conventional method for increasing the PWM resolution, the PWM resolution may be improved by increasing the operating frequency of the processing circuit. This method, however, will increase the power consumption and manufacturing cost of the processing circuit. In addition, under a condition that a rotational speed resolution of the processing circuit is insufficient, in response to a low rotational speed command being received by the processing circuit, the brushless DC motor may not be able to run at a low rotational speed required by the low rotational speed command, and in response to a high rotational speed command being received by the processing circuit, the rotational speed ripple of the brushless DC motor may be large, which may affect the output efficiency of the brushless DC motor. As a result, a novel method for increasing a resolution without increasing the operating frequency of the processing circuit of the brushless DC motor is urgently needed, wherein the resolution may be the PWM resolution or the rotational speed resolution.

SUMMARY OF THE INVENTION

It is therefore one of the objectives of the present invention to provide a method for increasing a resolution by N bits performed by a processing circuit of a motor driving system and associated motor driving system, to address the above-mentioned problems, wherein the resolution may be a PWM resolution or a rotational speed resolution, and N is a positive integer.

According to an embodiment of the present invention, a method for increasing a resolution by N bits performed by a processing circuit of a motor driving system it provided, wherein N is a positive integer. The method may include: performing a conversion upon an analog command, to generate a command count value; performing a first N-bit right-shifting operation upon the command count value, to generate an initial output value; performing a logical operation upon the command count value, to generate a low bit value; generating an overflow value according to the low bit value; and determining a final output value according to the initial output value and the overflow value; wherein the motor driving system may include the processing circuit, a driving circuit, and a brushless DC motor, a plurality of PWM signals are output from the processing circuit to the driving circuit, and a driving voltage is generated by the driving circuit according to the plurality of PWM signals, for driving the brushless DC motor.

According to an embodiment of the present invention, a motor driving system is provided. The motor driving system may include a brushless DC motor, a driving circuit, and a processing circuit for increasing a resolution by N bits. The driving circuit may be coupled to the brushless DC motor, and may be arranged to generate a driving voltage according to a plurality of PWM signals, wherein the driving voltage is arranged to drive the brushless DC motor. The processing circuit may be coupled to the driving circuit, and may be arranged to increase a resolution by N bits by: performing a conversion upon an analog command, to generate a command count value; performing a first N-bit right-shifting operation upon the command count value, to generate an initial output value, where N is a positive integer; performing a logical operation upon the command count value, to generate a low bit value; generating an overflow value according to the low bit value; determining a final output value according to the initial output value and the overflow value; and outputting each of the plurality of PWM signals to the driving circuit according to the final output value; wherein the resolution and the analog command are a PWM resolution and a PWM command, respectively, and the PWM command is arranged to control a voltage value of the driving voltage; or the resolution and the analog command are a rotational speed resolution and a rotational speed command, respectively, and the rotational speed command is arranged to control rotational speed of the brushless DC motor.

One of the benefits of the present invention is that, by the method of the present invention, the PWM resolution can be increased by X bits (e.g. X is a positive integer) without increasing the operating frequency of the processing circuit, which can reduce the power consumption and manufacturing cost of the processing circuit, and make the brushless DC motor run smoothly. In addition, by the method of the present invention, the rotation speed resolution can be increased by Y bits (e.g. Y is a positive integer). Since a rotational speed that may not be achieved due to insufficient rotational speed resolution can be achieved by the method of the present invention, the rotational speed ripple of the brushless DC motor can be improved. Additionally, since how many bits for increasing the PWM resolution or the rotation speed resolution can be determined according to design requirements, the design flexibility of the method of the present invention is large.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
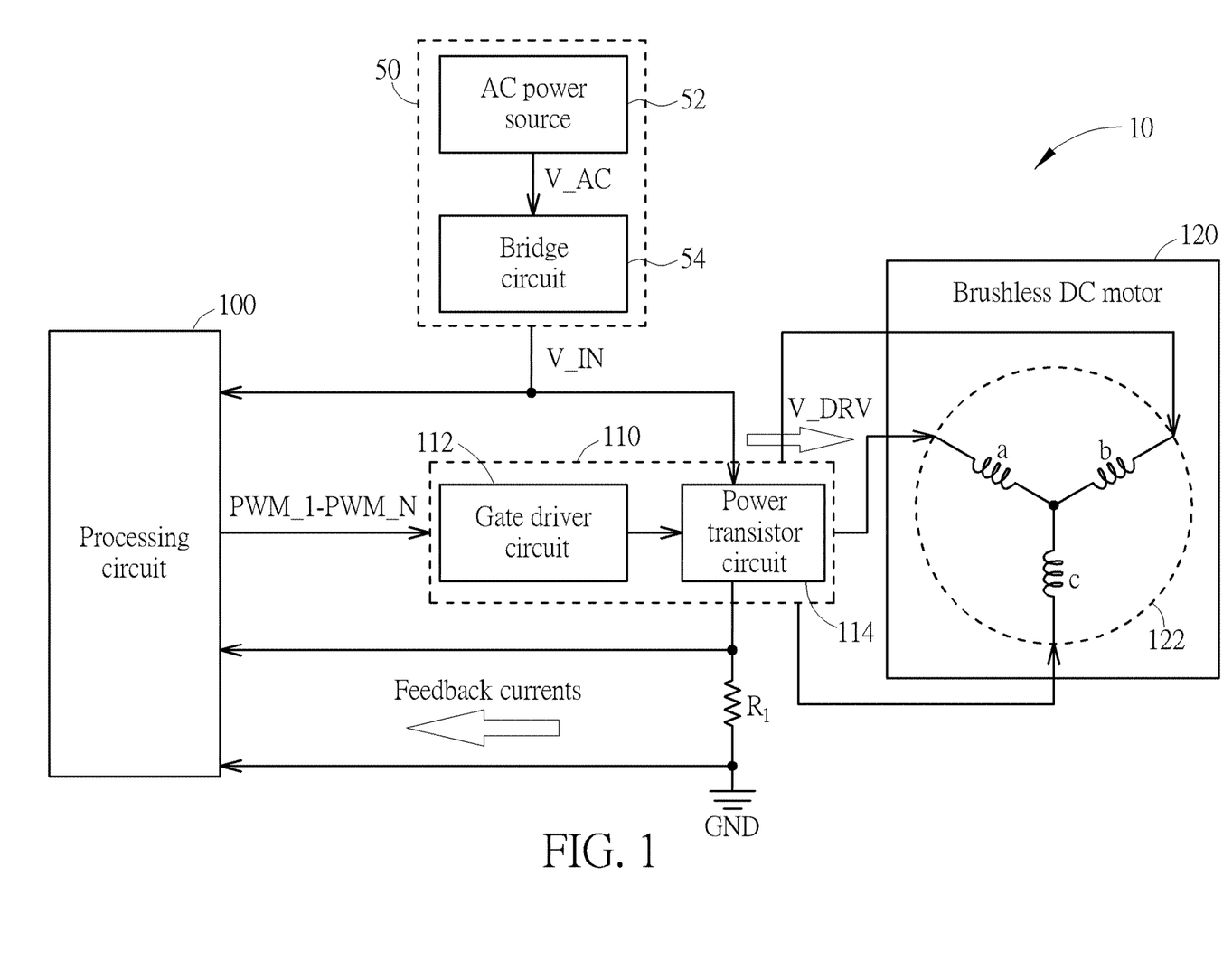
FIG. 1 is a diagram illustrating a motor driving system according to an embodiment of the present invention.

FIG. 1 is a diagram illustrating a motor driving system 10 according to an embodiment of the present invention. As shown in FIG. 1, the motor driving system 10 may include an input voltage generating circuit 50, a processing circuit 100 (e.g. a micro control unit (MCU)), a driving circuit 110, and a brushless direct current (DC) motor 120, wherein the brushless DC motor 120 may include a rotor (not shown) and a stator 122, the rotor may be a permanent magnet, the stator 122 may be a three phase stator winding. The stator 122 may have a Y-connection structure or a delta-connection structure, and may include a stator winding a, a stator winding b, and a stator winding c. In this embodiment, the stator 122 has the Y-connection structure, but the present invention is not limited thereto.

The input voltage generating circuit 50 may be coupled to the processing circuit 100 and the driving circuit 110, and may be arranged to generate and output an input voltage V_IN to the processing circuit 100 and the driving circuit 110. For example, the input voltage generating circuit 50 may include an alternating current (AC) power source 52 and a bridge circuit 54, wherein the bridge circuit 54 may be arranged to receive an AC voltage V_AC from the AV power source 52, and process the AC voltage V_AC to generate the input voltage V_IN, but the present invention is not limited thereto. The processing circuit 100 may be coupled to the driving circuit 110, and may be arranged to output a series of pulse width modulation (PWM) signals PWM_1-PWM_N (N≥1) to the driving circuit 110. The driving circuit 110 may be coupled to the stator 122 (more particularly, the stator winding a, the stator winding b, and the stator winding c) of the brushless DC motor 120, and may be arranged to generate a driving voltage V DRV according to the PWM signals PWM_1-PWM_N, for driving the brushless DC motor 120, wherein the driving voltage V DRV is proportional to rotational speed of the brushless DC motor 120. For example, the driving circuit 110 may include a gate driver circuit 112 and a power transistor circuit 114, wherein the gate driver circuit 112 may be coupled to the processing circuit 100, and the power transistor circuit 114 may be coupled to the bridge circuit 54, the gate driver circuit 112, and the stator 122 (more particularly, the stator winding a, the stator winding b, and the stator winding c) of the brushless DC motor 120, and may be arranged to receive the input voltage V_IN.

The motor driving system 10 may further include a shunt resistor $R_1$, wherein one terminal of the shunt resistor $R_1$ may be coupled to the power transistor circuit 114, and another terminal of the shunt resistor $R_1$ may be coupled to a reference voltage (e.g. a ground voltage GND). The processing circuit 100 may be coupled to two terminals of the shunt resistor $R_1$, and may be arranged to receive a plurality of feedback currents from the brushless DC motor 120 through the shunt resistor $R_1$.

It is assumed that the processing circuit 100 is an integer system, the operating frequency of the processing circuit 100 is 32 megahertz (MHz), and the operating frequency of the PWM signals PWM_1-PWM_N is 100 kilohertz (KHz), wherein an analog command (e.g. a PWM command) is received by the processing circuit 100, the PWM command is a signed number with 16 bits (i.e. the maximum of the PWM command is 32767 (i.e. $2^{15}-1$) for controlling a voltage value of the driving voltage V DRV, and a PWM count value of the processing circuit 100 is 320 (i.e. 32 MHz/100 KHz). The processing circuit 100 may execute algorithm to perform a method for increasing the PWM resolution by X bits without increasing the operating frequency of the processing circuit 100, wherein X may be a positive integer (i.e. X≥1), and the algorithm may be expressed as follows:

$$PWM_{OUT} = (PWM_{COMMAND} * PWM_{COUNT}) \gg$$
$$X + \left(\sum (PWM_{COMMAND} * PWM_{COUNT}) \& (2^X - 1)\right) \gg X$$

wherein $PWM_{OUT}$ is an output of each of the PWM signals PWM_1-PWM_N (i.e. a PWM output value), $PWM_{COMMAND}$ is the PWM command, $PWM_{COUNT}$ is the PWM count value, and ">>X" represents an X-bit right-shifting operation.

For better comprehension, in this embodiment, it is assumed that the PWM resolution is increased by 15 bits (i.e. X=15) performed by the processing circuit 100 through the algorithm, the number of the PWM signals PWM_1-PWM_N is 9 (i.e. N=9), and for each of the PWM signals PWM_1-PWM_9, the PWM command is 24444.

TABLE 1

|  | PWM_1 | PWM_2 | PWM_3 | PWM_4 | PWM_5 | PWM_6 | PWM_7 | PWM_8 | PWM_9 |
|---|---|---|---|---|---|---|---|---|---|
| LBV | 23296 | 23296 | 23296 | 23296 | 23296 | 23296 | 23296 | 23296 | 23296 |
| RLBV | 23296 | 13825 | 4354 | 27650 | 18179 | 8708 | 32004 | 22533 | 13062 |
| $PWM_{OUT}$ | 238 | 239 | 239 | 238 | 239 | 239 | 238 | 239 | 239 |

Table 1 illustrates an example of associated values involved in the algorithm executed by the processing circuit 100 to perform the method for increasing the PWM resolution by 15 bits. For example, for the PWM signal PWM_1, the PWM command (i.e. 24444) is multiplied by the PWM count value (i.e. 320), to generate a command count value CCV (i.e. CCV=$PWM_{COMMAND}*PWM_{COUNT}$=24444*320=7822080), and a 15-bit right-shifting operation is performed upon the command count value CCV, to generate an initial output value IOV (i.e. IOV=($PWM_{COMMAND}*PWM_{COUNT}$)>>15=7822080>>15=238). Afterwards, an AND operation is performed upon the command count value CCV and $2^{15}-1$, to generate a low bit value LBV (i.e. LBV=7822080 & ($2^{15}-1$)=23296), and the low bit value LBV is accumulated to generate an accumulated low bit value ALBV. For the PWM signal PWM_1, since the PWM signal PWM_1 is the first PWM signal in the series of PWM signals PWM_1-

PWM_9, the accumulated low bit value ALBV is equal to the low bit value LBV (i.e. ALBV=23296). Finally, a 15-bit right-shifting operation is performed upon the accumulated low bit value ALBV, to generate an overflow value OV (i.e. OV=23296>>15=0), wherein the overflow value OV may be 0 or 1. In response to the overflow value OV being 1, 1 is added to the initial output value IOV, to generate the PWM output value (i.e. if OV=1, $PWM_{OUT}$=IOV+1), and an AND operation is performed upon the accumulated low bit value ALBV and $2^{15}$-1, to generate a remained low bit value RLBV (i.e. ALBV & ($2^{15}$-1)=RLBV), wherein the remained low bit value RLBV is accumulated to the next PWM signal. In response to the overflow value OV being 0, the PWM output value is equal to the initial output value IOV (i.e. if OV=0, $PWM_{OUT}$=IOV), and the accumulated low bit value ALBV acts as the remained low bit value RLBV, to be accumulated to the next PWM signal. For the PWM signal PWM_1, in response to the overflow value OV being 0, the PWM output value is equal to the initial output value IOV (i.e. $PWM_{OUT}$=IOV=238), and the accumulated low bit value ALBV (=23296) acts as the remained low bit value RLBV, to be accumulated to the PWM signal PWM_2.

For the PWM signal PWM_2, the command count value CCV, the initial output value IOV, and the low bit value LBV of the PWM signal PWM_2 are the same as those of the PWM signal PWM_1. That is, the command count value CCV, the initial output value IOV, and the low bit value LBV of the PWM signal PWM_2 are equal to 7822080, 238, and 23296, respectively. Similar descriptions are omitted here for brevity. It should be noted that, the remained low bit value RLBV of the PWM signal PWM_1 (=23296) is accumulated to the low bit value LBV of the PWM signal PWM_2 (=23296), to generate the accumulated low bit value ALBV of the PWM signal PWM_2 (i.e. ALBV=23296+23296=46592). Afterwards, the 15-bit right-shifting operation is performed upon the accumulated low bit value ALBV, to generate the overflow value OV (i.e. OV=46592>>15=1). In response to the overflow value OV being 1, 1 is added to the initial output value IOV, to generate the PWM output value (i.e. $PWM_{OUT}$=238+1=239), and the AND operation is performed upon the accumulated low bit value ALBV and $2^{15}$-1, to generate the remained low bit value RLBV (i.e. RLBV=46592 & ($2^{15}$-1)=13825), wherein the remained low bit value RLBV is accumulated to the PWM signal PWM_3.

For the PWM signal PWM_3, the command count value CCV, the initial output value IOV, and the low bit value LBV of the PWM signal PWM_3 are the same as those of the PWM signal PWM_1. That is, the command count value CCV, the initial output value IOV, and the low bit value LBV of the PWM signal PWM_3 are equal to 7822080, 238, and 23296, respectively. Similar descriptions are omitted here for brevity. It should be noted that, the remained low bit value RLBV of the PWM signal PWM_2 (=13825) is accumulated to the low bit value LBV of the PWM signal PWM_3 (=23296), to generate the accumulated low bit value ALBV of the PWM signal PWM_3 (i.e. ALBV=23296+13825=37121). Afterwards, the 15-bit right-shifting operation is performed upon the accumulated low bit value ALBV, to generate the overflow value OV (i.e. OV=37121>>15=1). In response to the overflow value OV being 1, 1 is added to the initial output value IOV, to generate the PWM output value (i.e. $PWM_{OUT}$=238+1=239), and the AND operation is performed upon the accumulated low bit value ALBV and $2^{15}$-1, to generate the remained low bit value RLBV (i.e. RLBV=37121 & ($2^{15}$-1)=4354), wherein the remained low bit value RLBV is accumulated to the PWM signal PWM_4. For brevity, similar descriptions for the PWM signals PWM_4-PWM_9 are not repeated in detail here.

In this embodiment, when the PWM command is 24444, the ideal PWM output value is (24444/32767)*320=238.718. For the method of the present invention, an averaged PWM output value of the PWM signals PWM_1-PWM_9 is equal to 238.67 (238+239+239+238+239+239+238+239+239/9=238.67). Consider a case where the processing circuit 100 executes a conventional algorithm. The conventional algorithm is expressed as follows:

$$PWM_{OUT}=(PWM_{COMMAND}*PWM_{COUNT})>>X$$

wherein all of the PWM output values of the PWM signals PWM_1-PWM_9 is equal to 238, and an averaged PWM output value of the PWM signals PWM_1-PWM_9 is equal to 238 (238+238+238+238+238+238+238+238+238/9=238), which sacrifices 0.718 accuracy (238.718−238=0.718).

Compared with this case, the averaged PWM output value of the method of the present invention only sacrifices 0.051 accuracy (238.718-238.67=0.051), which is much smaller than the accuracy sacrificed by the conventional algorithm. In addition, regarding the method of the present invention, how many bits for increasing the PWM resolution can be determined according to design requirements. As a result, the design flexibility of the method of the present invention is large.

In addition to outputting the PWM signals PWM_1-PWM_N to the driving circuit 110 for generating the driving voltage V DRV that is arranged to drive the brushless DC motor 120, the processing circuit 100 may be further arranged to output the PWM signals PWM_1-PWM_N to control the angle (i.e. the rotational speed) of the brushless DC motor 120 according to the plurality of feedback currents that are received from the brushless DC motor 120 through the shunt resistor $R_1$. In computation of the angle of the brushless DC motor 120 performed by the processing circuit 100, the angle of the brushless DC motor 120 is obtained by utilizing the plurality of feedback currents to look up a table. As a result, the rotational speed resolution of the processing circuit 100 may be limited by the least significant bit (LSB) of the angle.

It is assumed that the LSB of the angle is an unsigned number with 16 bits, an analog command (e.g. a rotational speed command RC) is also an unsigned number with 16 bits (i.e. the number of rotational speed command RC (65536) corresponds to 360 degrees), and is arranged to control the rotational speed of the brushless DC motor 120, the sampling frequency of the processing circuit 100 is 50 KHz (i.e. the sampling period of the processing circuit 100 is 0.00002 s), and the number of poles of the brushless DC motor 120 is 5. For the rotational speed command RC, in the processing circuit 100, a unit angle is approximately equal to 0.0055 degrees (360 degrees/65535=0.0055 degrees), and a rotational speed resolution is approximately equal to 274.66 degrees/s (0.0055/0.00002=274.66 degrees/s), wherein the rotational speed resolution may be converted into 9.155 revolution(s) per minute (rpm; (274.66/360/5)*60=9.155 rpm). That is, when the rotational speed command RC is 1 or the change of the rotational speed command RC (e.g. from 1 to 2) is 1, the brushless DC motor 120 may run at 9.155 rpm. However, under the condition that the rotational speed resolution in the processing circuit 100 is 9.155 rpm, if the rotational speed of the brushless DC motor 120 is controlled to be 100 rpm by the processing circuit 100, the rotational speed ripple of the brushless DC motor 120 will be large, which may affect the output efficiency of the brushless DC motor 120. As a result, in addition to the PWM resolution, the processing circuit 100 may execute another algorithm to perform a method for increasing a rotation speed resolution in the processing circuit 100 by Y bits, wherein Y may be a positive integer (i.e. ≥1), and Y may be different from the above-mentioned X. In the method of the present invention, since how many bits for increasing the rotational speed resolution can be determined according to design requirements, the design flexibility of the method of the present invention is large.

Figure 2:
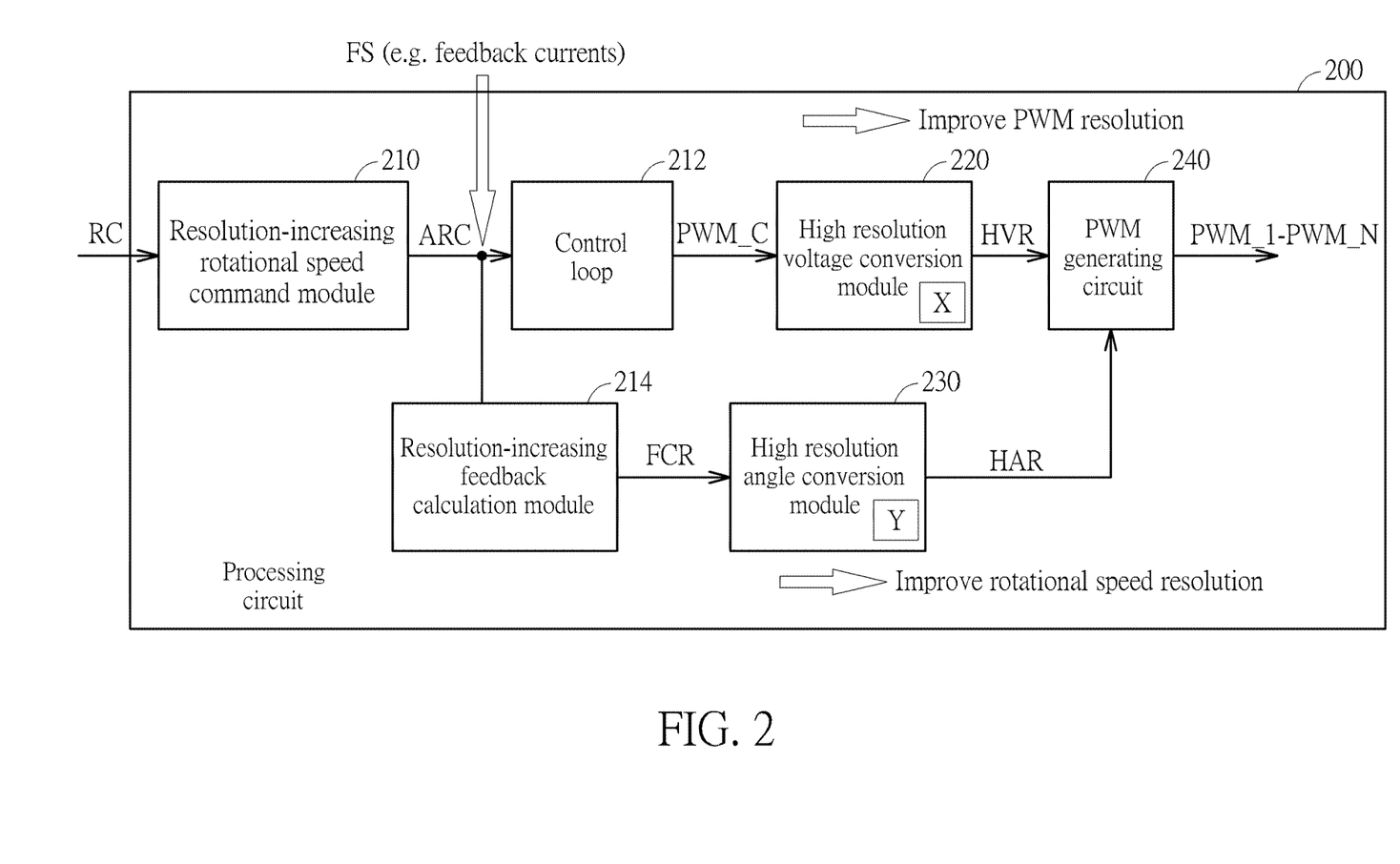
FIG. 2 is a diagram illustrating a processing circuit according to an embodiment of the present invention.

Please refer to FIG. 2. FIG. 2 is a diagram illustrating a processing circuit 200 according to an embodiment of the present invention, wherein the processing circuit 100 shown in FIG. 1 may be implemented by the processing circuit 200 shown in FIG. 2. As shown in FIG. 2, the processing circuit 200 may include a plurality of circuits, such as a resolution-increasing rotational speed command module 210, a control loop 212, a resolution-increasing feedback calculation module 214, a high resolution voltage conversion module 220, a high resolution angle conversion module 230, and a PWM generating circuit 240. The resolution-increasing rotational speed command module 210 may be arranged to receive the rotational speed command RC, and may be arranged to performing a Y-bit left-shifting operation upon the rotational speed command RC, to generate an amplified rotational speed command ARC.

It is assumed that the rotational speed command RC is the unsigned number with 16 bits, and Y is equal to 3. After a 3-bit left-shifting operation is performed upon the rotational speed command RC, the amplified rotational speed command ARC is generated, and the number of amplified rotational speed command ARC (65536<<3=524288) corresponds to 360 degrees, wherein under a condition that the rotational speed command RC corresponds to the rotational speed resolution being 9.155 rpm, the amplified rotational speed command ARC corresponds to the rotational speed resolution being 1.144 rpm (9.155/8=1.144). That is, when the amplified rotational speed command ARC is 1, the brushless DC motor 120 may run at 1.144 rpm.

The control loop 212 may be arranged to calculate how much voltage (e.g. the voltage value of the driving voltage V DRV) is required to be output to the brushless DC motor 120 according to a feedback signal FS (e.g. the plurality of feedback currents), to obtain the PWM command (for brevity, labeled as "PWM_C" in FIG. 2). The high resolution voltage conversion module 220 may be arranged to receive the PWM command from the control loop 212, and execute the above-mentioned algorithm to perform the method for increasing the PWM resolution by X bits. For brevity, similar descriptions are omitted here.

The resolution-increasing feedback calculation module 214 may be arranged to calculate the feedback rotational speed and angle of the brushless DC motor 120 according to the plurality of feedback currents and the amplified rotational speed command ARC, to generate a feedback calculation result FCR. The high resolution angle conversion module 230 may be arranged to execute said another algorithm according to the feedback calculation result FCR, to perform the method for increasing the rotation speed resolution in the processing circuit 200 by Y bits, wherein Y may be a positive integer (e.g. Y=3), and said another algorithm may be expressed as follows:

$$COMMAND_{ANGLE} = REAL_{VELOCITY} \gg Y + \left(\sum (REAL_{VELOCITY}) \& (2^Y - 1)\right) \gg Y$$

wherein $COMMAND_{ANGLE}$ is an output of the high resolution angle conversion module 230, $REAL_{VELOCITY}$ is the amplified rotational speed command ARC, and ">>Y" represents a Y-bit right-shifting operation.

TABLE 2

|  | n = 0 | n = 1 | n = 2 | n = 3 | n = 4 | n = 5 | n = 6 | n = 7 |
|---|---|---|---|---|---|---|---|---|
| LBV | 1 | 1 | 1 | 1 | 1 | 1 | 1 | 1 |
| RLBV | 1 | 2 | 3 | 4 | 5 | 6 | 7 | 0 |
| $COMMAND_{ANGLE}$ | 0 | 0 | 0 | 0 | 0 | 0 | 0 | 1 |

Table 2 illustrates an example of associated values involved in the algorithm executed by the processing circuit 200 to perform the method for increasing the rotational speed resolution by 3 bits. For better comprehension, it is assumed that the number of samplings performed by the processing circuit 200 is 8, and for each sampling, the amplified rotational speed command ARC is 1. For the first sampling (labeled as "n=0" in table 2), a 3-bit right-shifting operation is performed upon the amplified rotational speed command ARC, to generate an initial output value IOV (i.e. $IOV = (REAL_{VELOCITY} \gg 3 = 1 \gg 3 = 0)$), and an AND operation is performed upon the amplified rotational speed command ARC and $$2^3 - 1,$$

to generate a low bit value low value LBV $$(\text{i.e. } LBV = 1 \ \& \ (2^3 - 1) = 1).$$

Afterwards, the low bit value LBV is accumulated to generate an accumulated low bit value ALBV. For the first sampling (n=0), the accumulated low bit value ALBV is equal to the low bit value LBV (i.e. ALBV=LBV=1). Finally, a 3-bit right-shifting operation is performed upon the accumulated low bit value ALBV, to generate an overflow value OV (i.e. OV=0>>3=0), wherein the overflow value OV may be 0 or 1. In response to the overflow value OV being 1, 1 is added to the initial output value IOV, to generate the output of the high resolution angle conversion module 230 (i.e. if OV=1, $COMMAND_{ANGLE}$=IOV+1), and an AND operation is performed upon the accumulated low bit value ALBV and $$2^3 - 1,$$

to generate a remained low bit value RLBV (i.e. ALBV &

$$(\text{i.e. } ALBV \ \& \ (2^3 - 1) = RLBV),$$

wherein the remained low bit value RLBV is accumulated to the next sampling. In response to the overflow value OV being 0, the output of the high resolution angle conversion module 230 is equal to the initial output value IOV (i.e. if OV=0, COMMAND$_{ANGLE}$=IOV), and the accumulated low bit value ALBV acts as the remained low bit value RLBV, to be accumulated to the next sampling. For the first sampling (n=0), in response to the overflow value OV being 0, the output of the high resolution angle conversion module 230 is equal to the initial output value IOV (i.e. COMMAND$_{ANGLE}$=IOV=0), and the accumulated low bit value ALBV (ALBV=1) acts as the remained low bit value RLBV, to be accumulated to the second sampling (labeled as "n=1" in table 2).

For the second sampling, the initial output value IOV and the low bit value LBV of the second sampling (n=1) are same as those of the first sampling (n=0). That is, the initial output value IOV and the low bit value LBV of the second sampling (n=1) are 0 and 1, respectively. Similar descriptions are omitted here for brevity. It should be noted that, the remained low bit value RLBV (i.e. RLBV=1) of the first sampling (n=0) is accumulated to the low bit value LBV (i.e. LBV=1) of the second sampling (n=1), to generate the accumulated low bit value ALBV of the second sampling (n=1) (i.e. ALBV=1+1=2). Afterwards, the 3-bit right-shifting operation is performed upon the accumulated low bit value ALBV, to generate the overflow value OV (i.e. OV=2>>3=0). In response to the overflow value OV being 0, the output of the high resolution angle conversion module 230 is equal to the initial output value IOV (i.e. COMMAND$_{ANGLE}$=IOV=0), and the accumulated low bit value ALBV (i.e. ALBV=2) acts as the remained low bit value RLBV, to be accumulated to the third sampling (labeled as "n=2" in table 2). For brevity, similar descriptions for the third sampling to the seventh sampling (labeled as "n=6" in table 2) are not repeated in detail here.

For the eighth sampling (labeled as "n=7" in table 2), the initial output value IOV and the low bit value LBV of the eighth sampling (n=7) are the same as those of the first sampling (n=0). That is, the initial output value IOV and the low bit value LBV of the eighth sampling (n=7) are 0 and 1, respectively. Similar descriptions are omitted here for brevity. It should be noted that, the remained low bit value RLBV (i.e. RLBV=7) of the seventh sampling (n=6) is accumulated to the low bit value LBV (i.e. LBV=1) of the eighth sampling (n=7), to generate the accumulated low bit value ALBV of the eighth sampling (n=7) (i.e. ALBV=1+7=8). Afterwards, the 3-bit right-shifting operation is performed upon the accumulated low bit value ALBV, to generate the overflow value OV (i.e. OV=8>>3=1). In response to the overflow value OV being 1, 1 is added to the initial output value IOV, to generate the output of the high resolution angle conversion module 230 (i.e. COMMAND$_{ANGLE}$=0+1=1).

When the output of high resolution angle conversion module 230 is equal to 0, the brushless DC motor 120 may run at 0 rpm. When the output of the high resolution angle conversion module 230 is equal to 1, the brushless DC motor 120 may run at 9.155 rpm. In the 8 samplings, the average rotational speed of the brushless DC motor 120 is 1.144 rpm ((0+0+0+0+0+0+0+9.155)/8=1.144). In this way, although the real rotational speed of the brushless DC motor 120 is still 9.155 rpm, in the process of the 8 samplings, a rotational speed (e.g. 1.144 rpm) that may not be achieved due to insufficient rotational speed resolution can be achieved by the method of the present invention. As a result, the rotational speed ripple of the brushless DC motor 120 can be improved.

TABLE 3

|  | n = 0 | n = 1 | n = 2 | n = 3 | n = 4 | n = 5 | n = 6 | n = 7 |
|---|---|---|---|---|---|---|---|---|
| LBV | 2 | 2 | 2 | 2 | 2 | 2 | 2 | 2 |
| RLBV | 2 | 4 | 6 | 0 | 2 | 4 | 6 | 0 |
| COMMAND$_{ANGLE}$ | 0 | 0 | 0 | 1 | 0 | 0 | 0 | 1 |

Table 3 illustrates another example of associated values involved in the algorithm executed by the processing circuit 200 to perform the method for increasing the rotational speed resolution by 3 bits. For better comprehension, it is assumed that the number of samplings performed by the processing circuit 200 is 8, and for each sampling, the amplified rotational speed command ARC is 2 (which corresponds to 2.288 rpm). For the first sampling (labeled as "n=0" in table 3), a 3-bit right-shifting operation is performed upon the amplified rotational speed command ARC, to generate the initial output value IOV (i.e. IOV=REAL$_{VELOCITY}$>>3=2>>3=0), and an AND operation is performed upon the amplified rotational speed command ARC and $$2^3 - 1,$$

to generate the low bit value LBV (i.e. LBV=

$$(\text{i.e. } LBV = 2 \ \& \ (2^3 - 1) = 2).$$

Afterwards, the low bit value LBV is accumulated to generate the accumulated low bit value ALBV. For the first sampling (n=0), the accumulated low bit value ALBV is equal to the low bit value LBV (i.e. ALBV=LBV=2). Finally, a 3-bit right-shifting operation is performed upon the accumulated low bit value ALBV, to generate the overflow value OV (i.e. OV=2>>3=0) In response to the overflow value OV being 0, the output of the high resolution angle conversion module 230 is equal to the initial output value IOV (i.e. COMMAND$_{ANGLE}$=IOV=0), and the accumulated low bit value ALBV (i.e. ALBV=2) acts as the remained low bit value RLBV, to be accumulated to the second sampling (labeled as "n=1" in table 3).

For the second sampling, the initial output value IOV and the low bit value LBV of the second sampling (n=1) are the same as those of the first sampling (n=0). That is, the initial output value IOV and the low bit value LBV of the second sampling (n=1) are 0 and 2, respectively. Similar descriptions are omitted here for brevity. It should be noted that, the remained low bit value RLBV (i.e. RLBV=2) of the first sampling (n=0) is accumulated to the low bit value LBV (i.e. LBV=2) of the second sampling (n=1), to generate the accumulated low bit value ALBV of the second sampling (n=1) (i.e. ALBV=2+2=4). Afterwards, the 3-bit right-shifting operation is performed upon the accumulated low bit value ALBV, to generate the overflow value OV (i.e. OV=4>>3=0). In response to the overflow value OV being 0, the output of the high resolution angle conversion module 230 is equal to the initial output value IOV (i.e. COMMAND$_{ANGLE}$=IOV=0), and the accumulated low bit value ALBV (ALBV=4) acts as the remained low bit value RLBV, to be accumulated to the third sampling (labeled as "n=2" in table 3). For brevity, similar descriptions for the third sampling are not repeated in detail here.

For the fourth sampling (labeled as "n=3" in table 3), the initial output value IOV and the low bit value LBV of the fourth sampling (n=3) are same as those of the first sampling (n=0). That is, the initial output value IOV and the low bit value LBV of the fourth sampling (n=3) are 0 and 2, respectively. Similar descriptions are omitted here for brevity. It should be noted that, the remained low bit value RLBV (i.e. RLBV=6) of the third sampling (n=2) is accumulated to the low bit value LBV (i.e. LBV=2) of the fourth sampling (n=3), to generate the accumulated low bit value ALBV of the fourth sampling (n=3) (i.e. ALBV=2+6=8). Afterwards, the 3-bit right-shifting operation is performed upon the accumulated low bit value ALBV, to generate the overflow value OV (i.e. OV=8>>3=1). In response to the overflow value OV being 1, 1 is added to the initial output value IOV, to generate the output of the high resolution angle conversion module 230 (i.e. COMMAND$_{ANGLE}$=0+1=1), and an AND operation is performed upon the accumulated low bit value ALBV and $$2^3 - 1,$$

to generate the remained low bit value RLBV (i.e. RLBV=

$$(\text{i.e. } RLBV = 8 \ \& \ (2^3 - 1) = 0),$$

wherein the remained low bit value RLBV is accumulated to the next sampling.

Similarly, for the fifth sampling (labeled as "n=4" in table 3) to the eighth sampling (labeled as "n=7" in table 3), the outputs of the high resolution angle conversion module 230 are equal to 0, 0, 0, and 1, respectively. When the output of high resolution angle conversion module 230 is equal to 0, the brushless DC motor 120 may run at 0 rpm. When the output of the high resolution angle conversion module 230 is equal to 1, the brushless DC motor 120 may run at 9.155 rpm. In the 8 samplings, the average rotational speed of the brushless DC motor 120 is 2.288 rpm ((0+0+0+9.155+0+0+0+9.155)/8=2.288). In this way, although the real rotational speed of the brushless DC motor 120 is still 9.155 rpm, in the process of the 8 samplings, a rotational speed (e.g. 2.288 rpm) that may not be achieved due to insufficient rotational speed resolution can be achieved by the method of the present invention. As a result, the rotational speed ripple of the brushless DC motor 120 can be improved.

The PWM generating circuit 240 may be arranged to receive a high resolution voltage conversion result HVR and a high resolution angle conversion result HAR from the high resolution voltage conversion module 220 and the high resolution angle conversion module 230, respectively, to generate and output the PWM signals PWM_1-PWM_N to the driving circuit 110. For brevity, similar descriptions for this embodiment are not repeated in detail here.

Figure 3:
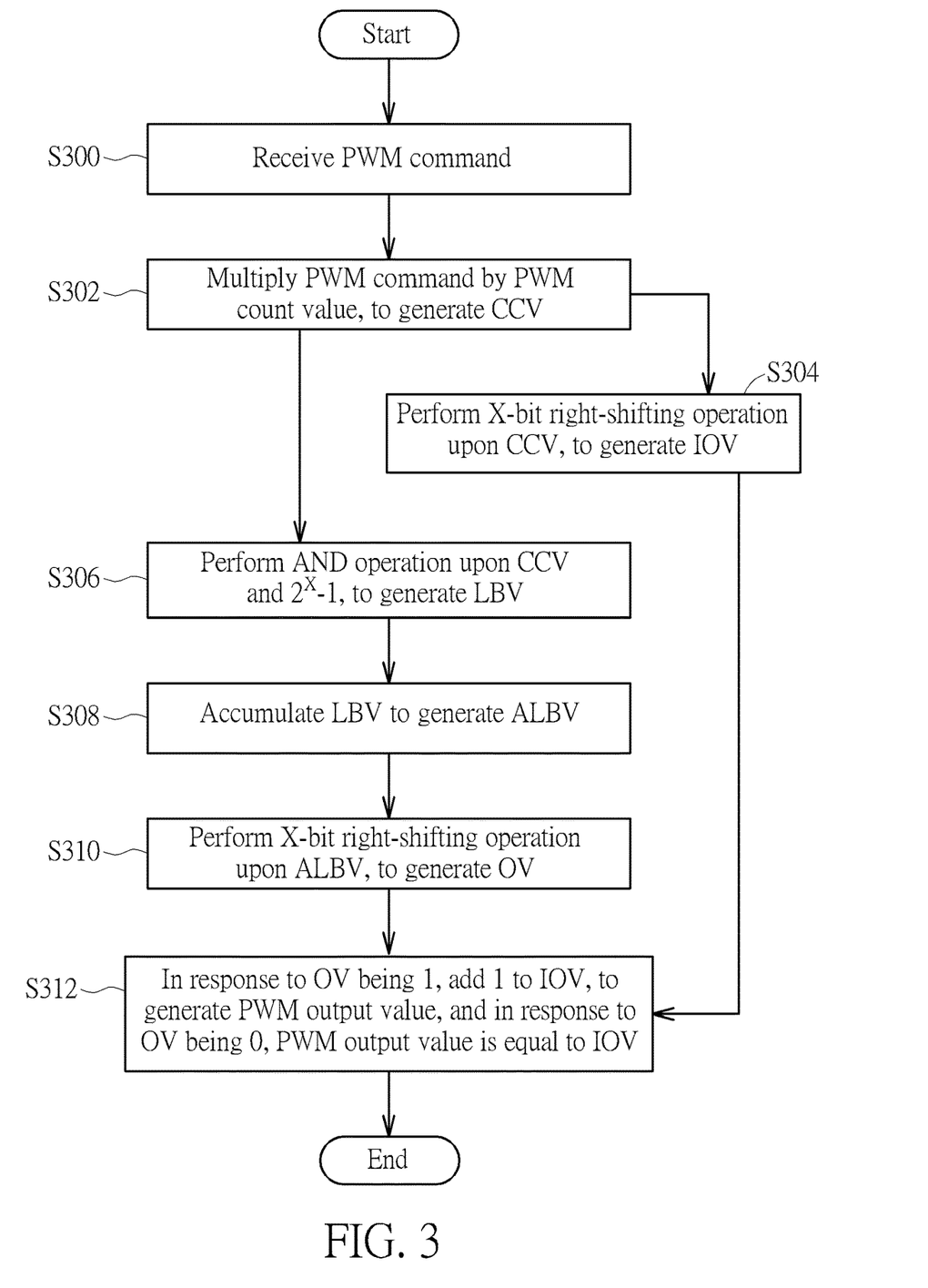
FIG. 3 is a flow chart of a method for increasing the PWM resolution by X bits according to an embodiment of the present invention.

FIG. 3 is a flow chart of a method for increasing the PWM resolution by X bits according to an embodiment of the present invention, wherein X is a positive integer. Provided that the result is substantially the same, the steps are not required to be executed in the exact order shown in FIG. 3. For example, the method shown in FIG. 3 may be employed by the processing circuit 100 shown in FIG. 1 or the processing circuit 200 shown in FIG. 2 (more particularly, the high resolution voltage conversion module 220).

In Step S300, a PWM command is received from the control loop 212.

In Step S302, the PWM command is multiplied by a PWM count value, to generate a command count value CCV, wherein the PWM count value is generated by dividing an operating frequency of the processing circuit 200 by an operating frequency of the PWM signals.

In Step S304, an X-bit right-shifting operation is performed upon the command count value CCV, to generate an initial output value IOV.

In Step S306, an AND operation is performed upon the command count value CCV and $$2^X - 1,$$

to generate a low bit value LBV.

In Step S308, the low bit value LBV is accumulated to generate an accumulated low bit value ALBV.

In Step S310, an X-bit right-shifting operation is performed upon the accumulated low bit value ALBV, to generate an overflow value OV.

In Step S312, in response to the overflow value OV being 1, 1 is added to the initial output value IOV, to generate the PWM output value, and in response to the overflow value OV being 0, the PWM output value is equal to the initial output value IOV.

Since a person skilled in the pertinent art can readily understand details of the steps after reading above paragraphs directed to the processing circuit 100 shown in FIG. 1 or the processing circuit 200 shown in FIG. 2, further description is omitted here for brevity.

Figure 4:
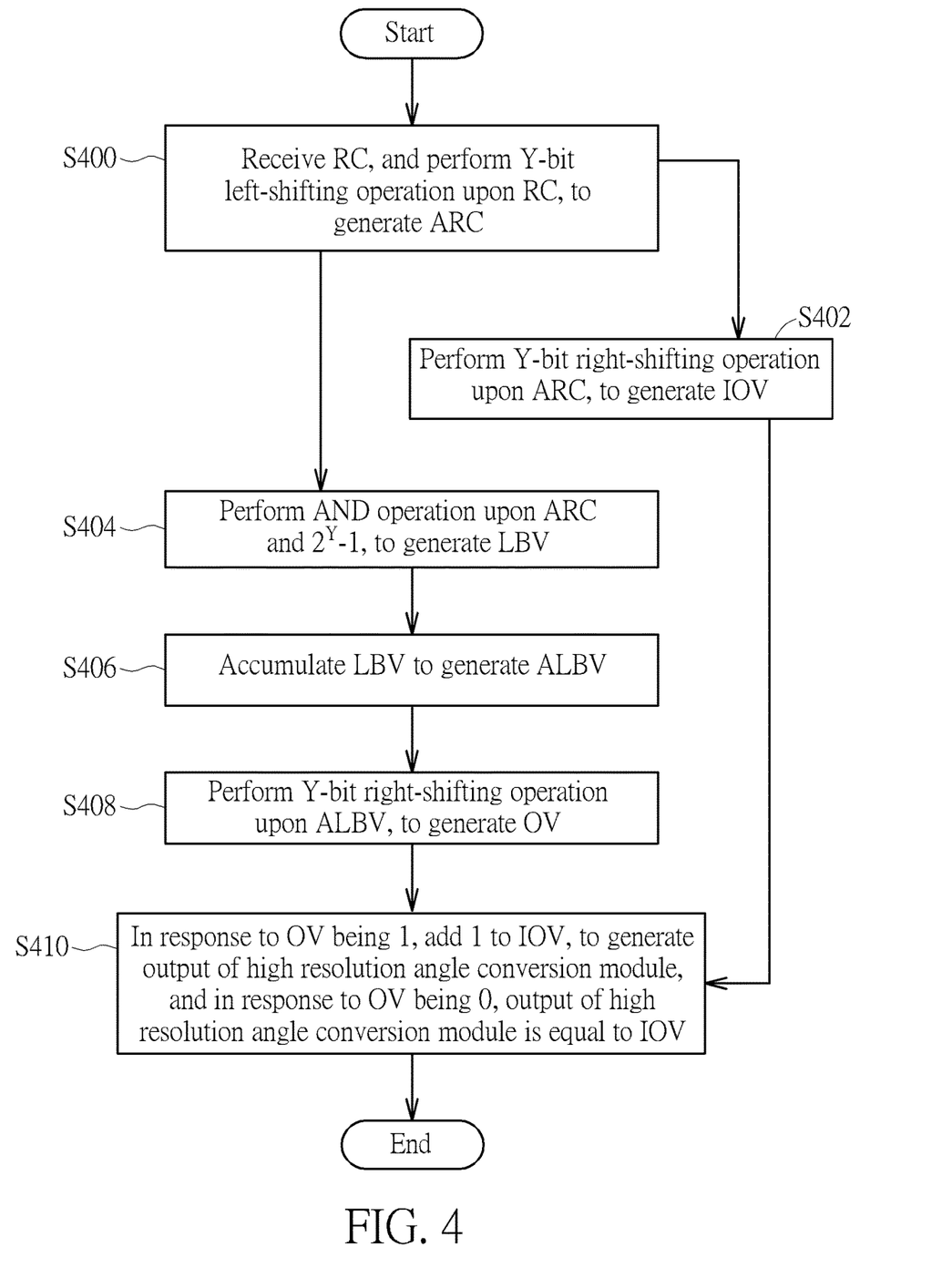
FIG. 4 is a flowchart of a method for increasing the rotational speed resolution by Y bits according to an embodiment of the present invention.

FIG. 4 is a flowchart of a method for increasing the rotational speed resolution by Y bits according to an embodiment of the present invention, wherein Y is a positive integer. Provided that the result is substantially the same, the steps are not required to be executed in the exact order shown in FIG. 4. For example, the method shown in FIG. 4 may be employed by the processing circuit 100 shown in FIG. 1 or the processing circuit 200 shown in FIG. 2 (more particularly, the high resolution angle conversion module 230).

In Step S400, a rotational speed command RC is received by the processing circuit 200, and a Y-bit left-shifting operation is performed upon the rotational speed command RC, to generate an amplified rotational speed command ARC.

In Step S402, a Y-bit right-shifting operation is performed upon the amplified rotational speed command ARC, to generate an initial output value IOV.

In Step S404, an AND operation is performed upon the amplified rotational speed command ARC and $$2^Y - 1,$$

to generate a low bit value LBV.

In Step S406, the low bit value LBV is accumulated to generate an accumulated low bit value ALBV.

In Step S408, a Y-bit right-shifting operation is performed upon the accumulated low bit value ALBV, to generate an overflow value OV.

In Step S410, in response to the overflow value OV being 1, 1 is added to the initial output value IOV, to generate an output of the high resolution angle conversion module 230, and in response to the overflow value OV being 0, the output of the high resolution angle conversion module 230 is equal to the initial output value IOV.

Since a person skilled in the pertinent art can readily understand details of the steps after reading above paragraphs directed to the processing circuit 100 shown in FIG. 1 or the processing circuit 200 shown in FIG. 2, further description is omitted here for brevity.

In summary, by the method of the present invention, the PWM resolution can be increased by X bits (e.g. X is a positive integer) without increasing the operating frequency of the processing circuit, which can reduce the power consumption and manufacturing cost of the processing circuit and make the brushless DC motor run smoothly. In addition, by the method of the present invention, the rotation speed resolution can be increased by Y bits (e.g. Y is a positive integer). Since a rotational speed that may not be achieved due to insufficient rotational speed resolution can be achieved by the method of the present invention, the rotational speed ripple of the brushless DC motor can be improved. Additionally, since how many bits for increasing the PWM resolution or the rotation speed resolution can be determined according to design requirements, the design flexibility of the method of the present invention is large.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing a resolution by N bits performed by a processing circuit of a motor driving system, where N is a positive integer, and the method comprises:
    performing a conversion upon an analog command, to generate a command count value;
    performing a first N-bit right-shifting operation upon the command count value, to generate an initial output value;
    performing a logical operation upon the command count value, to generate a low bit value;
    generating an overflow value according to the low bit value; and
    determining a final output value according to the initial output value and the overflow value;
    wherein the motor driving system comprises the processing circuit, a driving circuit, and a brushless direct current (DC) motor, each of a plurality of pulse width modulation (PWM) signals is output from the processing circuit to the driving circuit according to the final output value, and a driving voltage is generated by the driving circuit according to the plurality of PWM signals, for driving the brushless DC motor.

2. The method of claim 1, wherein the resolution is a PWM resolution, and the analog command is a PWM command for controlling a voltage value of the driving voltage.

3. The method of claim 2, wherein performing the conversion upon the analog command, to generate the command count value comprises:
    multiplying the PWM command and a PWM count value, to generate the command count value, wherein the PWM count value is generated by dividing an operating frequency of the processing circuit by an operating frequency of the plurality of PWM signals.

4. The method of claim 2, wherein performing the logical operation upon the command count value, to generate the low bit value comprises:
    ANDing the command count value and $$2^N - 1,$$

to generate the low bit value.

5. The method of claim 2, wherein generating the overflow value according to the low bit value comprises:
    accumulating the low bit value, to generate an accumulated low bit value; and
    performing a second N-bit right-shifting operation upon the accumulated low bit value, to generate the overflow value.

6. The method of claim 2, wherein determining the final output value according to the initial output value and the overflow value further comprises:
    in response to the overflow value being 1, adding 1 to the initial output value, to generate the final output value.

7. The method of claim 2, wherein determining the final output value according to the initial output value and the overflow value comprises:
    in response to the overflow value being 0, the final output value is equal to the initial output value.

8. The method of claim 1, wherein the resolution is a rotational speed resolution, and the analog command is a rotational speed command for controlling rotational speed of the brushless DC motor.

9. The method of claim 8, wherein performing the conversion upon the analog command, to generate the command count value comprises:
    performing an N-bit left-shifting operation upon the rotational speed command, to generate an amplified rotational speed command as the command count value.

10. The method of claim 8, wherein performing the logical operation upon the command count value, to generate the low bit value comprises:
    ANDing the command count value and $$2^N - 1,$$

to generate the low bit value.

11. The method of claim 8, wherein generating the overflow value according to the low bit value comprises:
    accumulating the low bit value, to generate an accumulated low bit value; and
    performing a second N-bit right-shifting operation upon the accumulated low bit value, to generate the overflow value.

12. The method of claim 8, wherein determining the final output value according to the initial output value and the overflow value comprises:
    in response to the overflow value being 1, adding 1 to the initial output value, to generate the final output value.

13. The method of claim 8, wherein determining the final output value according to the initial output value and the overflow value further comprises:
    in response to the overflow value being 0, the final output value is equal to the initial output value.

14. A motor driving system, comprising:
a brushless direct current (DC) motor;
a driving circuit, coupled to the brushless DC motor, and arranged to generate a driving voltage according to a plurality of pulse width modulation (PWM) signals, wherein the driving voltage is arranged to drive the brushless DC motor; and
a processing circuit, coupled to the driving circuit, and arranged to increase a resolution by N bits by:
  performing a conversion upon an analog command, to generate a command count value;
  performing a first N-bit right-shifting operation upon the command count value, to generate an initial output value;
  performing a logical operation upon the command count value, to generate a low bit value;
  generating an overflow value according to the low bit value;
  determining a final output value according to the initial output value and the overflow value; and
  outputting each of the plurality of PWM signals to the driving circuit according to the final output value;
wherein N is a positive integer;
wherein the resolution and the analog command are a PWM resolution and a PWM command, respectively, and the PWM command is arranged to control a voltage value of the driving voltage; or the resolution and the analog command are a rotational speed resolution and a rotational speed command, respectively, and the rotational speed command is arranged to control rotational speed of the brushless DC motor.

* * * * *